United States Patent
Reck et al.

(10) Patent No.: US 10,036,481 B2
(45) Date of Patent: Jul. 31, 2018

(54) ISOLATION VALVE WITH THERMOPLASTIC OVERMOLDING

(71) Applicants: NIBCO Inc., Elkhart, IN (US); Joel M. Reck, Wayland, MA (US)

(72) Inventors: Michael E. Reck, Worcester, MA (US); Mark Roy, Jr., Boylston, MA (US); Andrew J. Terry, Sturbridge, MA (US)

(73) Assignee: NIBCO Inc., Elkhart, IN (US)

( * ) Notice: Subject to any disclaimer, the term of this patent is extended or adjusted under 35 U.S.C. 154(b) by 94 days.

(21) Appl. No.: 14/858,220

(22) Filed: Sep. 18, 2015

(65) Prior Publication Data

US 2016/0084398 A1 Mar. 24, 2016

Related U.S. Application Data

(60) Provisional application No. 62/052,836, filed on Sep. 19, 2014.

(51) Int. Cl.
*F16K 27/06* (2006.01)
*F16K 5/06* (2006.01)

(52) U.S. Cl.
CPC .......... *F16K 27/067* (2013.01); *F16K 5/0657* (2013.01)

(58) Field of Classification Search
CPC .............................. F16K 27/067; F16K 5/0657

USPC .......................................... 251/315.01, 315.1
See application file for complete search history.

(56) References Cited

U.S. PATENT DOCUMENTS

| | | | | |
|---|---|---|---|---|
| 5,782,162 A | * | 7/1998 | Lanteigne | F15B 15/14 384/295 |
| 8,220,126 B1 | * | 7/2012 | Yunk | B29C 45/14598 264/236 |
| 8,844,111 B1 | * | 9/2014 | Yunk, Jr. | B29C 35/02 264/236 |
| 2004/0235683 A1 | * | 11/2004 | Moffett | B29C 33/64 508/202 |
| 2008/0098886 A1 | * | 5/2008 | Lindsten | F16J 1/008 92/248 |
| 2010/0108147 A1 | * | 5/2010 | Renard | F16K 11/0853 137/1 |

* cited by examiner

*Primary Examiner* — Marina Tietjen
(74) *Attorney, Agent, or Firm* — Price Heneveld LLP

(57) ABSTRACT

The present invention is generally directed to an isolation valve unit including a valve body comprised of a metal, such as brass, and having at least two ports, at least one of the ports including an overmolded thermoplastic end surrounding and enclosing the port. In one embodiment, the thermoplastic end is composed of a polypropylene random (PP-R) material and is securely formed over the port by way of an over molding technique. The valve unit further includes a ball valve accommodated within the valve body and a handle for actuating the ball valve. The isolation valve unit is configured to control the flow of fluids in a plumbing system via actuation of the ball valve.

17 Claims, 6 Drawing Sheets

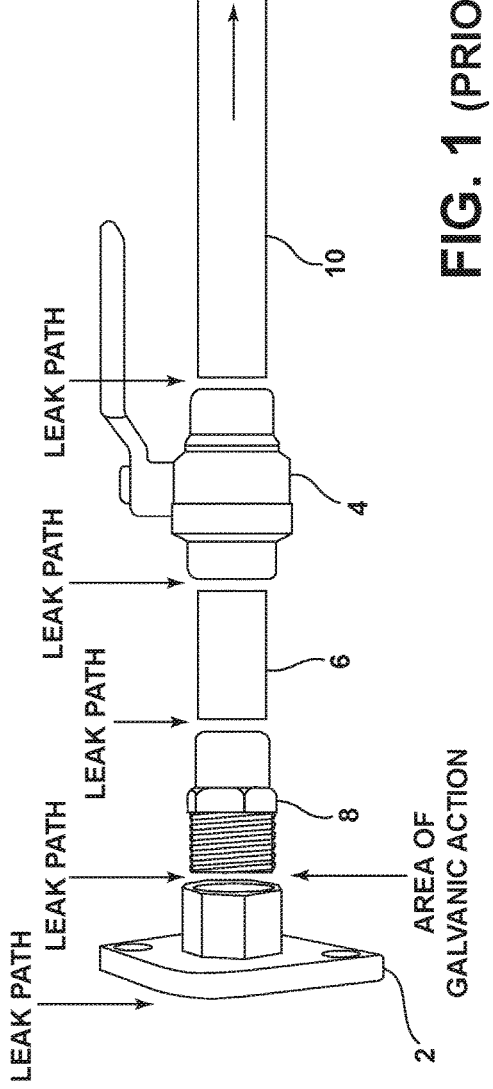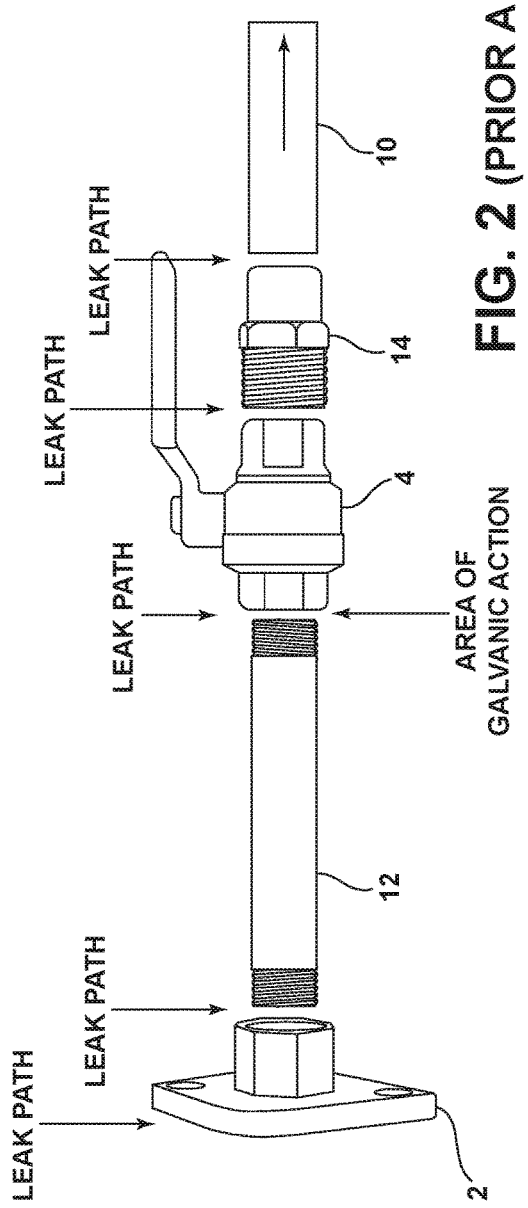

ISOLATION VALVE WITH THERMOPLASTIC OVERMOLDING

CROSS-REFERENCE TO RELATED APPLICATIONS

This application claims the benefit of, and priority to, U.S. Provisional Application Ser. No. 62/052,836, filed Sep. 19, 2015, the content of which is incorporated by reference herein in its entirety.

FIELD OF THE INVENTION

This invention relates generally to isolation valves, and, more particularly, to an isolation valve unit having at least one port with an overmolded thermoplastic end.

BACKGROUND

Isolation valves are well known and are traditionally used in plumbing and heating applications to control the flow of water or other fluid to and from an in-line appliance or piece of equipment for purposes of maintenance, replacement or repair. For example, as shown in FIG. 1, a ball valve used in a plumbing and heating application includes a separate flange 2, a conventional ball valve 4, and a copper nipple 6 and copper adapter 8 that connect the flange 2 to the conventional ball valve 4. The ball valve 4 is attached to the plumbing or heating system with copper tubing 10. The in-line appliance (not shown) may be attached to the flange 2. Alternatively, an iron nipple 12 has been used to connect the iron flange 2 to the ball valve 4, and a copper adapter 14 has been used to connect the ball valve 4 to the copper tubing 10, as shown in FIG. 2. As shown in FIGS. 1 and 2, in the conventional methods, there are several potential leak paths. Also, there are areas of galvanic action between dissimilar metals, such as the brass-iron metals. Further, installation of the flange, the nipples, and the adapters in this type of configuration is time consuming and expensive.

In an effort to overcome some of the disadvantages associated with metal valves and piping, some plumbing fixtures (e.g., valves, pipes, and/or fittings) may be made of a plastic material. Plastic plumbing can resist corrosion, is generally nontoxic and approved for carrying potable water, and may further eliminate any rusty or metallic taste in drinking water that metal pipes can leave. Because they do not corrode or rust and are not subject to scaling, plastic pipes are less likely to develop "build up" on the inner surfaces, which may be common to metal plumbing pipes. As such, plastic plumbing may allow water to flow unhindered for a long period of time.

Despite its benefits, the use of plastic plumbing may be limited. For example, in instances in which the control and delivery of high water pressure is desired, plastic plumbing fixtures may fail. For example, in certain installations (e.g., multistory building), water pressure can be extreme. Unlike conventional metal plumbing, plastic plumbing, specifically plastic valves, may be insufficient and unable to withstand the high pressure without failure.

SUMMARY

The present invention provides an isolation valve unit including a valve body comprised of a metal, such as brass, and having at least two ports, at least one of the ports including an overmolded thermoplastic end surrounding and enclosing the port. In one embodiment, the thermoplastic end is composed of a polypropylene random (PP-R) material and is securely formed over the port by way of an over molding technique. The valve unit further includes a ball valve accommodated within the valve body and a handle for actuating the ball valve. The isolation valve unit is configured to control the flow of fluids in plumbing systems by way of the ball valve.

The isolation valve unit of the present invention is constructed from both metal and thermoplastic polymers, thereby providing the benefits of both materials. For example, in one embodiment, the valve body is constructed from brass, thereby allowing the valve to be used in high pressure applications and further providing durability commonly associated with brass valves. One or more of the ports includes an overmolded thermoplastic polymer end, specifically a PP-R material, integrally surrounding and enclosing a portion of the port. The overmolded PP-R ends provide the benefits associated with plastic plumbing while limiting the drawbacks. Furthermore, overmolding the PP-R material onto a port of the valve body provides an integral transition between the valve body and coupling interface of the PP-R end, resulting in a decrease in the number of fittings that are otherwise required, thereby reducing the opportunity for leaks. As such, the PP-R end(s) may provide an improved means of coupling the valve unit to fittings, pipes, etc of a plumbing system.

Accordingly, the isolation valve unit of the present invention reduces the cost and time required when performing maintenance on a system, such as throttling and/or balancing an in-line appliance of a system, such as a pump. The isolation valve unit of the present invention also reduces the number of joints and/or flanges, thereby reducing the volume of a system and the number of leakage paths. Further, the present invention also provides an isolation valve unit that prevents the cracking of brittle iron flanges and prevents galvanic action that may otherwise occur between two dissimilar metals, as is the case with current valves in the marketplace. Furthermore, the PP-R ends of the valve unit allow an improved connection between each PP-R end and additional components of a plumbing system, such as additional thermoplastic fittings, piping, lines, etc. More specifically, use of PP-R material on ports of the valve unit allow fusion welding techniques to be employed to couple each PP-R end to additional thermoplastic components of the plumbing system by way of a fusion welding techniques, resulting in a homogenous joining of the PP-R overmolded port with the additional component, further ensuring a leak-free plumbing system.

BRIEF DESCRIPTION OF THE DRAWINGS

FIG. 1 is a perspective side view of one embodiment of a conventional piping and valve system.

FIG. 2 is a perspective side view of another embodiment of a conventional piping and valve system.

DETAILED DESCRIPTION

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment.

By way of overview, the present invention is generally directed to an isolation valve unit including a valve body comprised of a metal, such as brass, and having at least two ports, at least one of the ports including an overmolded thermoplastic end surrounding and enclosing the port. In one embodiment, the thermoplastic end is composed of a polypropylene random (PP-R) material and is securely formed over the port by way of an over molding technique. The valve unit further includes a ball valve accommodated within the valve body and a handle for actuating the ball valve. The isolation valve unit is configured to control the flow of fluids in heating and plumbing systems by way of the ball valve.

Figure 3:
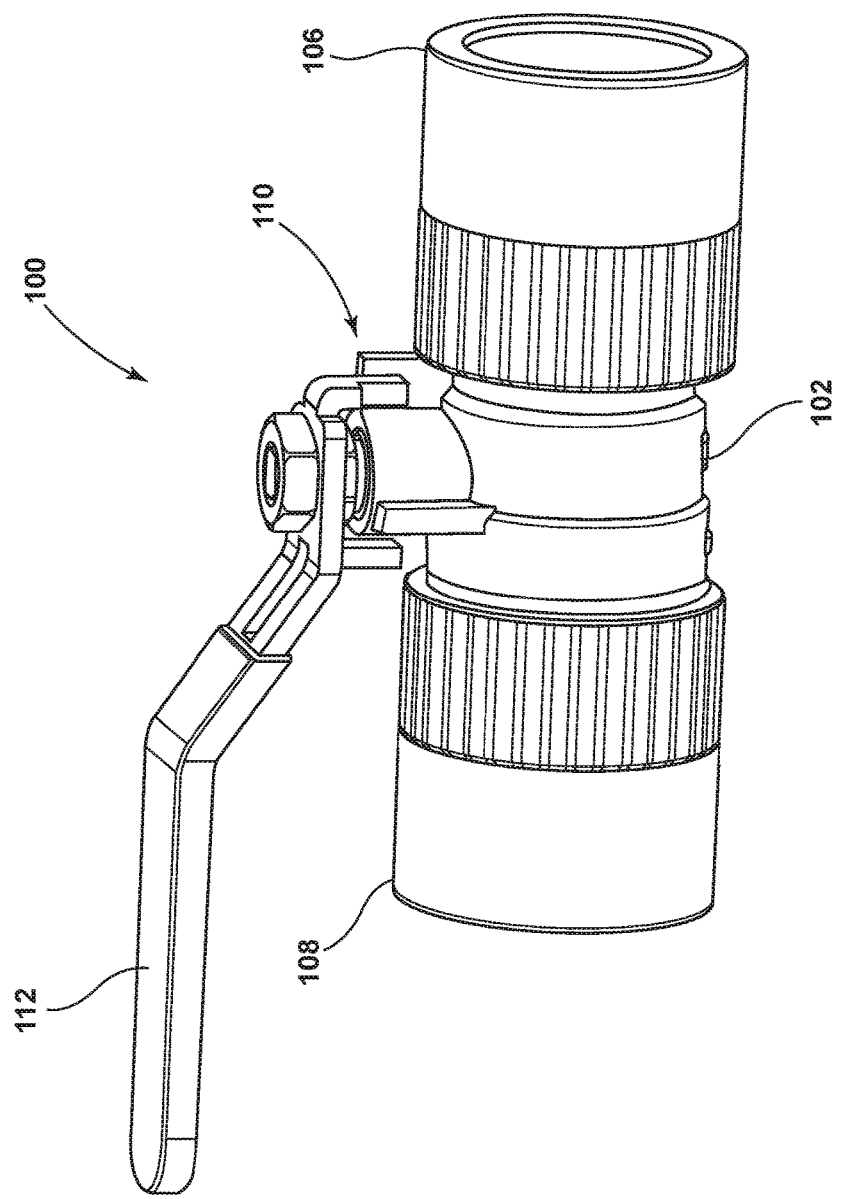
FIG. 3 is a perspective side view of one embodiment of an isolation valve unit consistent with the present disclosure.
Figure 4:
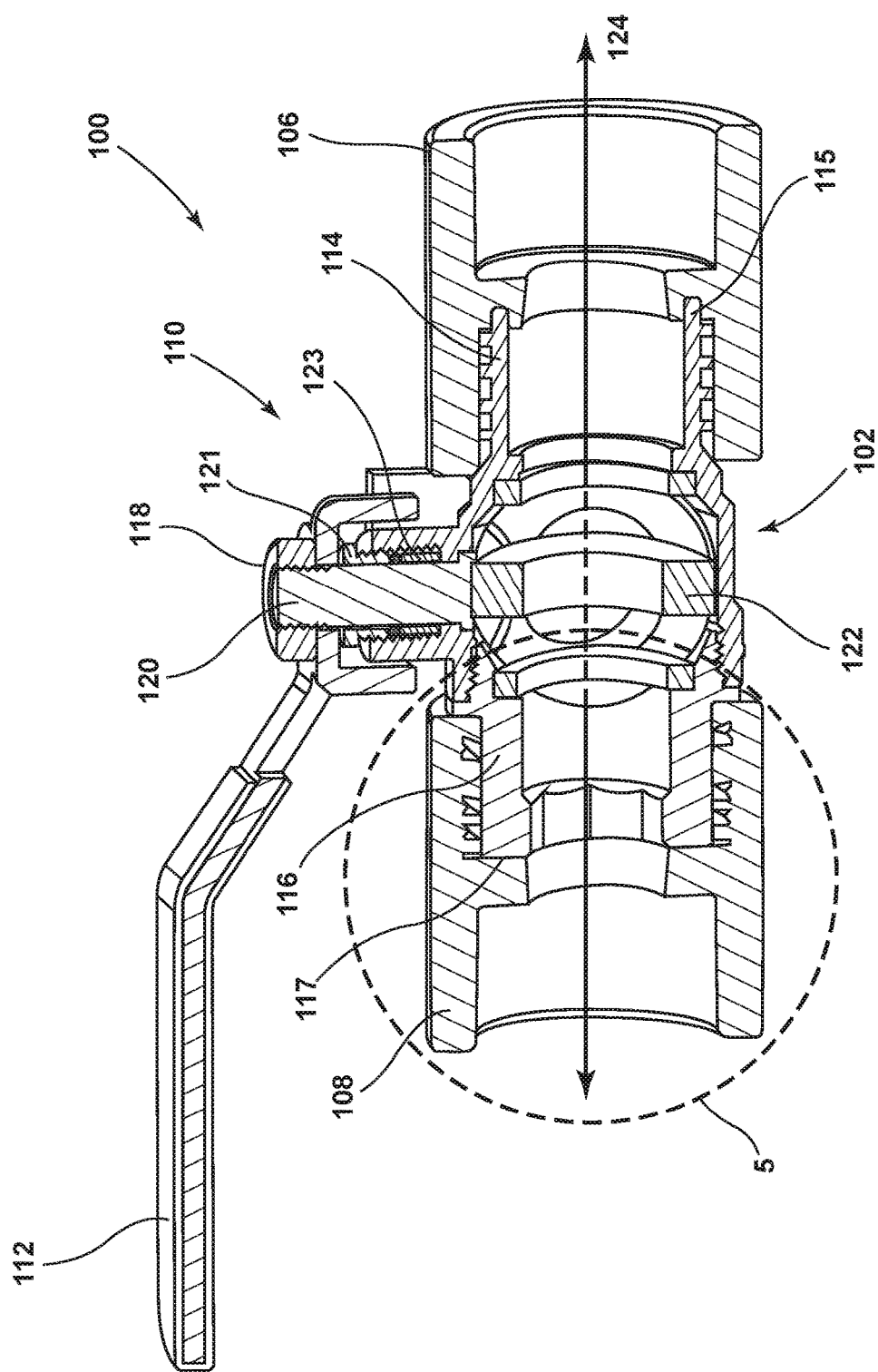
FIG. 4 is a cut-away side view of the isolation valve unit of FIG. 3.

FIG. 3 is a perspective side view of one embodiment of an isolation valve unit 100 consistent with the present disclosure and FIG. 4 is a cut-away side view of the isolation valve unit of FIG. 3. The isolation valve unit 100 includes a valve body 102 having a first end 106 and a second end 108 and generally defining a flow channel (indicated by arrow 124) through which a fluid may flow. The flow channel 124 provides fluid communication between the first and second ends 106, 108. The isolation valve 100 further includes a flow diversion device 110 for controlling the flow fluid within the flow channel 124. The flow diversion device 110 may be in the form of a ball valve disposed within the valve body 102 and in between the first and second ends 106, 108. The flow diversion device 110 is configurable between at least a first configuration, in which fluid is permitted to freely flow between the first and second ends 106, 108, and a second configuration, in which the flow diversion device 110 restricts the flow channel 124 and prevents fluid flow between the first and second ends 106, 108. The flow diversion device 110 is configurable between the first and second configurations via a flow adjustment means 112, such as a lever, wing, oval or butterfly handle, for example.

As shown in FIG. 4, the valve body 102 generally includes a first port 114 and a second port 116 defined on either side of the flow diversion device 110. In some embodiments, at least one of the first and second ports 114, 116 and the valve body 102 are of unitary construction, in the form of cast or hot forged metal material, such as brass. In some embodiments, at least one of the first and second ports 114, 116 is releasably coupled to the valve body 102 via threaded engagement or the like. The flow diversion device 110 may generally include a handle nut 118, a stem 120, a packing gland 121, and a ball 122. The handle 112 is affixed to the stem 120 with the handle nut 118. Movement of the handle 112 repositions the ball 122 to alter the flow channels of the valve unit 100. As shown, the ball 122 defines at least a first opening equal in diameter to the inner diameter of the first and second ports 114, 116. The position of the handle 112 in a first position (as shown) positions the ball 122 to prevent fluid flow through the valve body 102 between the first and second ends 106, 108. The handle is configured to move to a second position, in which the opening in the ball 122 is in axial alignment with at least the first and second ports 114, 116, thereby allowing fluid to flow axially from the first end 106, through the valve body 102, and to the second end 108 along the flow channel 124.

The valve body 102, including the first and second ports 114, 116, may be made from cast or hot forged brass. Since plumbing and heating systems may include brass or copper tubing, this prevents the occurrence of electrolysis and galvanic action at the junction of the isolation valve unit 100 and any system tubing. The ball 122 may be actuated with a blow-out proof stem 120. The ball 122 is actuated with a handle 112. The stem 120 is sealed with a stem seal 123 and an adjustable packing gland 121.

As shown, distal portions 115, 117 of the first and second ports 114, 116 are each enclosed and encapsulated by the associated first and second ends 106, 108, respectively. In particular, the first and second ends 106, 108 are composed of a thermoplastic polymer, such as a polypropylene random (PP-R), and formed over the corresponding first and second ports 114, 116 by way of an over molding technique. The overmolded PP-R ends 106, 108 provide an integral transition between the valve body 102 and a coupling interface of each of the PP-R ends 106, 108. The first and second PP-R ends 106, 108 may each be configured to connect with additional components of a plumbing system, such as, for example, additional fittings, flanges, pipes, lines, etc., as required to ultimately couple the valve unit 100 to an in-line appliance or piece of equipment via the additional components in any manner suitable to the desired end purpose. For example, the first and second PP-R ends 106, 108 may include a threaded portion, a friction fit connector, a crimped connector, a clamped connector, a quick disconnect connector, or the like. Additionally, or alternatively, each of the PP-R ends 106, 108 may be configured to be coupled to additional components via a fusion welding technique, particularly if the additional components are constructed of a similar material (e.g., thermoplastic). In particular, at least one of the PP-R ends can be joined, via a fusion welding, to an additional component (e.g., pipe) constructed of a material having substantially similar composition and/or melting point, thereby resulting in a homogenous joining of the PP-R overmolded port with the additional component, further ensuring a leak-free connection.

Figure 5:
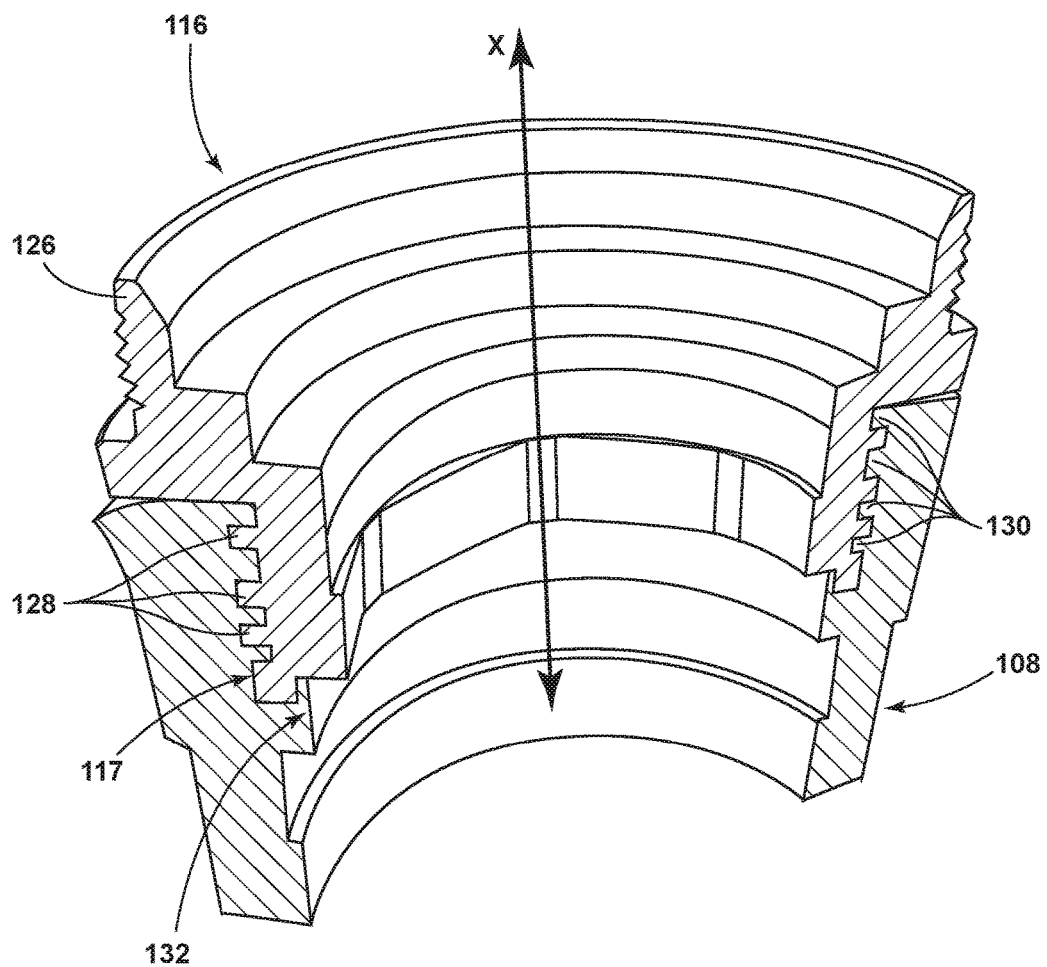
FIG. 5 is an enlarged cut-away side view of a port including an overmolded PP-R end of the isolation valve unit of FIG. 4.

FIG. 5 is an enlarged cut-away side view of the second port 116 including the overmolded PP-R end 108. It should be noted that the following description focuses on the second port and overmolded PP-R end for ease of description, and such description is applicable to the first port 114 and overmolded PP-R end 106. As shown, the second port 116 may be a separate brass end of the valve unit 100. In particular, the second port 116 may include a proximal portion 126, opposite the distal portion 117, configured to releasably couple the second port 116 to the valve body 102 via a threaded engagement (see FIG. 4). As shown, the distal portion 117 of the second port 116 may include one or more protrusions or ribs 128 formed on an outer surface thereof. The ribs 128 may extend along a circumference of the second port 116 and may be substantially orthogonal to a longitudinal axis X of the second port 116. In some embodiments, one or more of the ribs 128 may extend along the outer surface of the distal portion 117 and may be substantially parallel with the longitudinal axis X. The PP-R end 108 encapsulates and surrounds at least the ribs 128 along the outer surface of the distal portion 117. In particular, portions of the PP-R end 108 fill in channels 130 formed between adjacent ribs 128, thereby providing a secure engagement between the PP-R end 108 and the distal portion 117 of the second port 116. In some embodiments, two adjacent ribs may each have an undercut, thereby forming a channel that tapers in width from the base of the channel to the terminating edges of the channel. In particular, the undercut may generally resemble a trapezoid or a dovetail joint. Accordingly, the tapered channel may enhance the engagement between the overmolded PP-R end 108 and the distal portion 117 of the second port 116, ensuring that the overmolded PP-R end 108 is securely coupled to the second port 116 and resist separation of the overmolded PP-R end 108 from the distal end of the second port 116. Additionally, the inclusion of a rib that is substantially parallel to the longitudinal axis X may prevent the PP-R end 108 from rotating about the distal portion 117 of the second port 116 once coupled thereto. The PP-R end 108 may further encapsulate an inner surface of the distal portion 117 of the second port 116, as indicated by arrow 132.

Figure 6:
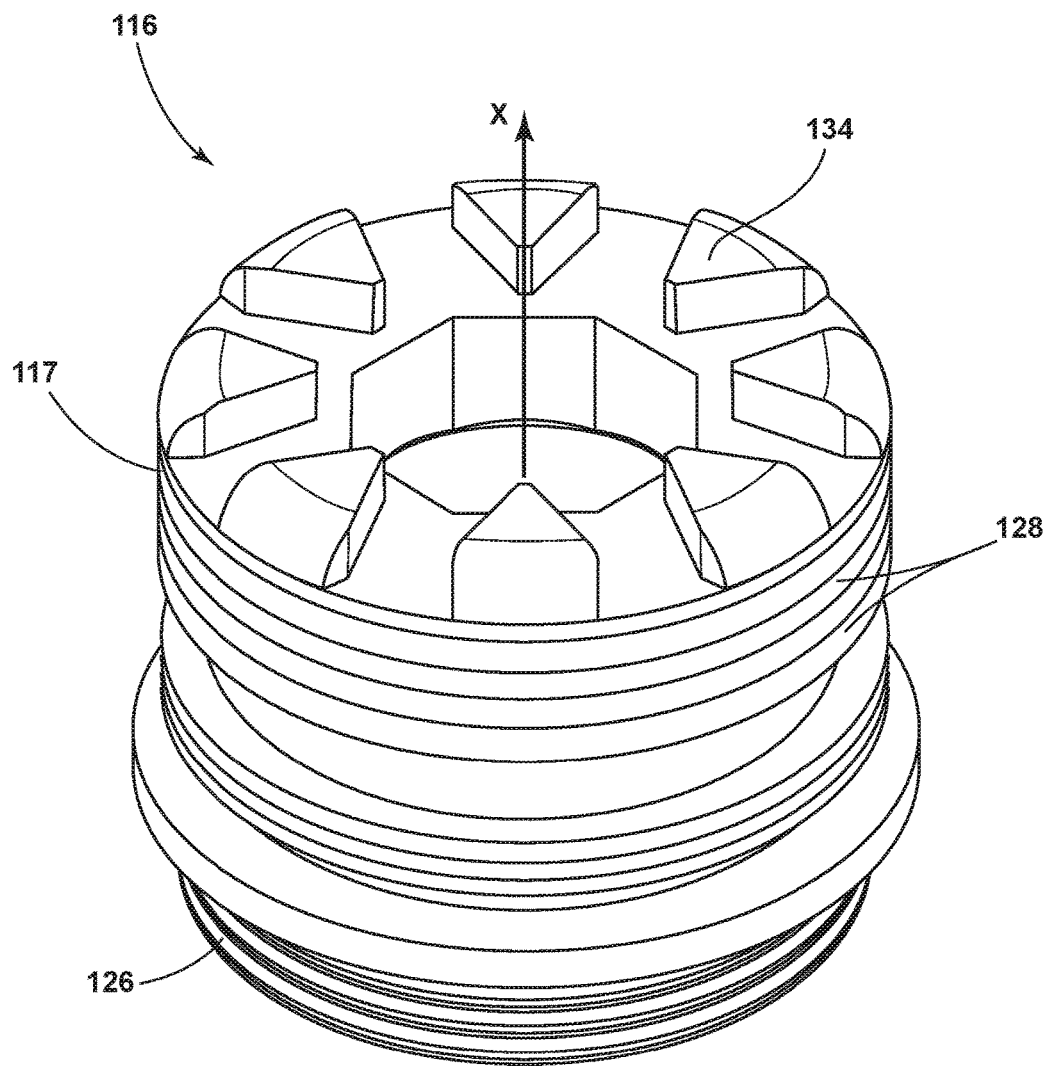
FIG. 6 is a perspective view of a port illustrating protrusions to be encapsulated by an overmolded thermoplastic.

FIG. 6 is a perspective view of the second port 116 without the PP-R material overmolded thereto, so as to more clearly illustrate the features on the outer surface of the port 116. In addition to including one or more ribs 128 formed on an outer surface thereof, the second port 116 may further include one or more protrusions 134 extending from the distal portion 117 and may be spaced equidistant along a circumference of the distal portion 117. The protrusions 134 may generally extend in a direction that is substantially parallel to the longitudinal axis X of the second port 116, such that the protrusions 134 are configured to prevent the PP-R end 108 from rotating about the distal portion 117 of the second port 116 once coupled thereto.

A large number of thermoplastic polymeric materials are contemplated as being useful in the overmolding of one or more portions of the isolation valve unit 100. The thermoplastic materials may be employed alone or in blends. Suitable thermoplastic materials include, but are not limited to, rubber modified polyolefins, metallocene, polyether-ester block copolymers, polyether-amide block copolymers, thermoplastic based urethanes, copolymers of ethylene with butene and maleic anhydride, hydrogenated maleic anhydride, polyester polycaprolactone, polyester polyadipate, polytetramethylene glycol ether, thermoplastic elastomer, polypropylene, vinyl, chlorinated polyether, polybutylene terephthalate, polymethylpentene, silicone, polyvinyl chloride, thermoplastic polyurethane, polycarbonate, polyurethane, polyamide, polybutylene, polyethylene and blends thereof. In one embodiment, a polypropylene random (PP-R) copolymer material is used in forming the overmolded ends 106, 108.

Figure 7:
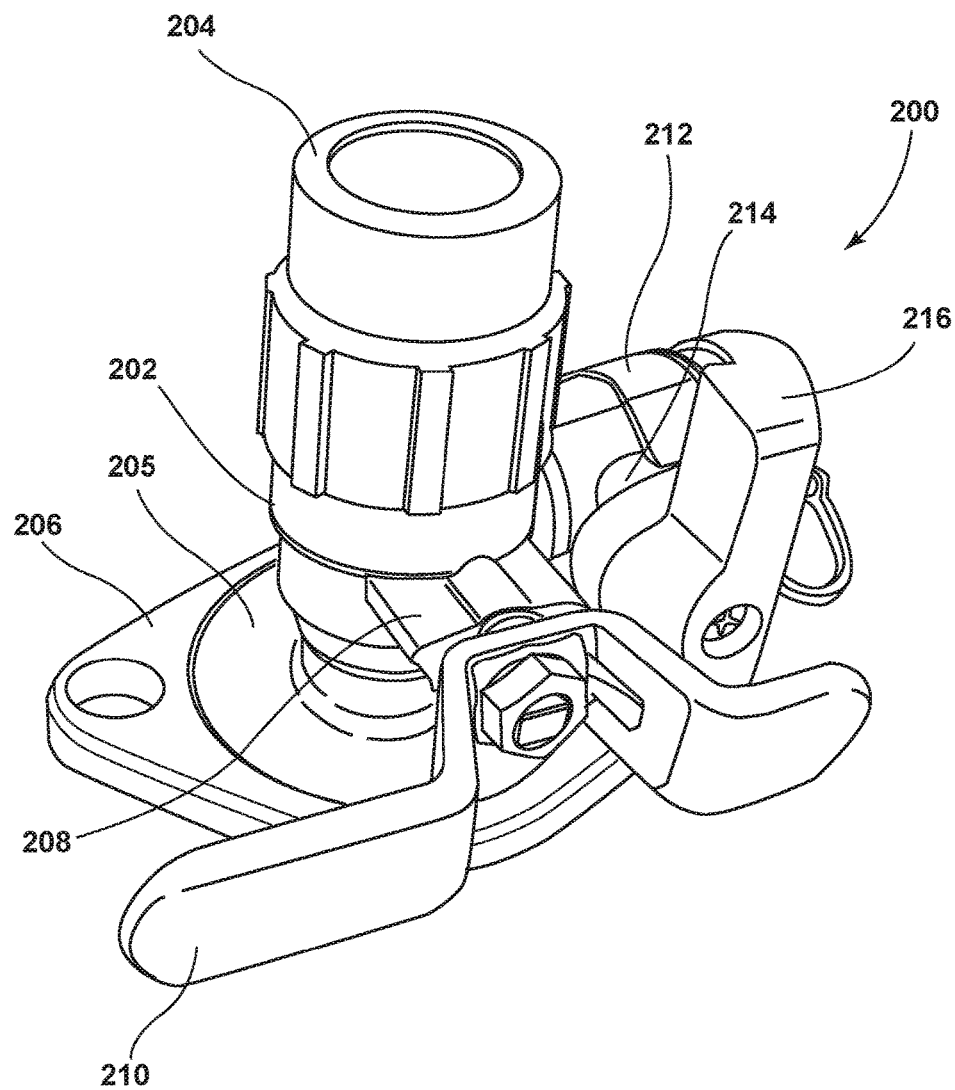
FIG. 7 is a perspective view of another embodiment of an isolation valve unit consistent with the present disclosure.

As generally understood, the present invention is applicable in a variety of isolation valve configurations and is not limited to the valve 100 of FIGS. 3-6. For example, as shown in FIG. 7, an isolation valve unit 200 consistent with the present disclosure includes a valve body 202 having at least a first end 204 and an opposing second end 205 and generally defining a first flow channel (not shown) extending from the first end 204 to the second end 205. The valve body 202 further includes a rotatable flange 206 positioned about a portion of the second end 205 which may be adapted for connecting directly to an apparatus in a plumbing system, such as a pump, for example. The flange 206 may be implemented as a multi-piece rotatable flange such as disclosed in co-pending, commonly owned U.S. patent application Ser. No. 12/749,020 titled, Rotatable Flange Apparatus and Method, the content of which is hereby incorporated by reference in its entirety.

The valve unit 200 further includes a main flow diversion device 208 (e.g., ball valve) for controlling the flow fluid within the first flow channel. The main flow diversion device 208 may be in the form of a ball valve disposed within the valve body 202 and in between the first and second ends 204, 205. The main flow diversion device 208 is configurable between at least a first configuration, in which fluid is permitted to freely flow between the first and second ends 204, 205, and a second configuration, in which the main flow diversion device 208 prevents fluid flow between the first and second ends 204, 205. The main flow diversion device 208 is configurable between the first and second configurations via a flow adjustment means 210, such as a lever, wing, oval or butterfly handle, for example.

A drain/venting valve portion 212 may extend from the valve body 202. The drain/venting valve portion 212 may be used to drain a system in the vicinity of the valve unit 200, described in greater detail herein. The drain/venting valve portion 212 may include a secondary flow diversion device 214 that is actuated by a handle 216. The drain/venting valve portion 212 may be in alignment with the main flow diversion device 208 such that, upon actuation of the main flow diversion device 208 to the second configuration, for example, a second flow channel may be defined between the second end 205 and the drain/venting valve portion 212 or the first end 204 and the drain/venting valve portion 212 for allowing purging.

Similar to the valve unit 100 of FIGS. 3-6, most of the components of the valve unit 200 are formed from a metal material. In particular, the valve body 202, the second end 205, the flange 206, and the drain/venting valve portion 212 are in the form of cast or hot forged metal material, such as brass. As shown, at least the first end 204 generally includes an overmolded PP-R end, which encloses and encapsulates a port (not shown) defined on the valve body 202. Similar to the valve unit 100 of FIGS. 3-6, the overmolded PP-R end 204 provides an integral transition between the valve body 202 and a coupling interface of the PP-R end 204, resulting in a decrease in the number of fittings that are otherwise required, thereby reducing the opportunity for leaks. Furthermore, the PP-R end 204 allows an improved connection with additional components of a plumbing system, such as additional thermoplastic fittings, piping, lines, etc. More specifically, the PP-R end 204 may be coupled to an additional component (of a substantially similar material) via fusion, resulting in a homogenous joining of the PP-R end 204 with the additional component, further ensuring a leak-free path within the plumbing system.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A fluid isolation valve comprising:
    a metal valve body having a first port and a second port and defining a flow channel between the first and second ports;
    an overmolded thermoplastic polymer end surrounding and enclosing a distal portion of one of the first and second ports; and
    a flow diversion device disposed in the valve body between the first and second ports and configured to control and alter the flow channel;
    wherein the distal portion of one of the first and second ports comprises ribs formed on an outer surface thereof;
    wherein at least one of the ribs is substantially parallel with a longitudinal axis of the first or second port and is configured to prevent the overmolded end from rotating about the distal portion of the first or second port to which it is coupled.

2. The fluid isolation valve of claim 1, wherein the valve body is made of brass.

3. The fluid isolation valve of claim 1, wherein the overmolded end comprises polypropylene random (PP-R) material.

4. The fluid isolation valve of claim 1, wherein two immediately adjacent ribs form a channel in between, wherein the channel is configured to receive a portion of the overmolded thermoplastic polymer within.

5. The fluid isolation valve of claim 4, wherein each of the two immediately adjacent ribs includes an undercut such that the channel tapers in width from a base of the channel to terminating edges of the channel.

6. The fluid isolation valve of claim 5, wherein the tapered channel is configured to enhance engagement between the overmolded end and the distal portion of one of the first and second ports.

7. The fluid isolation valve of claim 1, wherein at least one of the ribs extends along a circumference of the outer surface of the distal portion and is substantially orthogonal to a longitudinal axis of the first or second port.

8. A fluid isolation valve comprising:
    a metal valve body having a first port and a second port and defining a flow channel between the first and second ports;
    an overmolded thermoplastic polymer end surrounding and enclosing a distal portion of one of the first and second ports; and
    a flow diversion device disposed in the valve body between the first and second ports and configured to control and alter the flow channel;
    wherein the distal portion of one of the first and second ports comprises at least one protrusion extending therefrom in a direction substantially parallel to a longitudinal axis of the first or second port, the at least one protrusion is configured to prevent the overmolded end from rotating about the distal portion of the first or second port to which it is coupled.

9. The fluid isolation valve of claim 8, wherein the overmolded end encapsulates an inner surface of the distal portion of the first or second port.

10. The fluid isolation valve of claim 8, wherein the flow diversion device is actuatable between a first position, wherein the flow diversion device is configured to open the flow channel such that the first port is in fluid communication with the second port, and a second position, wherein flow diversion device is configured to close the flow channel such that the first and second ports are not in fluid communication with one another.

11. A fluid isolation valve comprising:
a metal valve body having a first port and a second port and defining a flow channel between the first and second ports, wherein the distal portion of the first port comprises ribs formed on an outer surface thereof, wherein at least two of the ribs extend along a circumference of the outer surface and are substantially orthogonal to a longitudinal axis of the first port;
a flow diversion device disposed in the valve body between the first and second ports and configured to control and alter the flow channel; and
an overmolded thermoplastic polymer end surrounding and enclosing the one or more ribs on the distal portion of the first port, wherein the overmolded thermoplastic polymer end comprises polypropylene random (PP-R) material;
wherein at least one of the ribs is substantially parallel with a longitudinal axis of the first port and is configured to prevent the overmolded end from rotating about the distal portion of the first port.

12. The fluid isolation valve of claim 11, wherein two immediately adjacent ribs form a channel in between, wherein the channel is configured to receive a portion of the overmolded thermoplastic polymer within.

13. The fluid isolation valve of claim 12, wherein each of the two immediately adjacent ribs includes an undercut such that the channel tapers in width from a base of the channel to terminating edges of the channel in cross-section, the tapered channel configured to enhance engagement between the overmolded end and the distal portion of the first port.

14. The fluid isolation valve of claim 11, wherein the distal portion of the first port comprises at least one protrusion extending therefrom in a direction substantially parallel to a longitudinal axis of the first port, the at least one protrusion is configured to prevent the overmolded end from rotating about the distal portion of the first port to which it is coupled.

15. The fluid isolation valve of claim 11, wherein the overmolded end encapsulates an inner surface of the distal portion of the first port.

16. The fluid isolation valve of claim 11, wherein the flow diversion device is actuatable between a first position, wherein the flow diversion device is configured to open the flow channel such that the first port is in fluid communication with the second port, and a second position, wherein flow diversion device is configured to close the flow channel such that the first and second ports are not in fluid communication with one another.

17. The fluid isolation valve of claim 11, wherein the valve body is made of brass.

* * * * *